Dec. 14, 1954

F. NOE 2,697,015

THRUST BEARING FOR JOURNAL BOXES

Filed Aug. 14, 1952

INVENTOR
*Frank Noe*
BY
*Mitchell & Bechert*
ATTORNEYS

United States Patent Office 2,697,015
Patented Dec. 14, 1954

2,697,015

THRUST BEARING FOR JOURNAL BOXES

Frank Noe, New Britain, Conn., assignor to The Fafnir Bearing Company, New Britain, Conn., a corporation of Connecticut Application August 14, 1952, Serial No. 304,283

1 Claim. (Cl. 308—180)

My invention relates to a journal box and more particularly to a thrust bearing for use in a journal box and the like, for taking end thrusts between the box and the axle.

In railroad and similar journal bearings, an angular contact bearing is often employed for taking end thrusts and it is desirable that in such a thrust bearing the inner bearing ring have an extensive surface for contact with the end of the journal or axle, so that the inner ring is kept in rotation by the rotating axle or journal. While it is desirable to have a very considerable area of the inner bearing ring in engagement with the end of the journal or axle, it is also desirable to have a substantial central opening or bore in the inner ring so as to permit the application of train control devices and the like, some active part of which is usually required to engage the center portion of the end of a rotating axle. It is also desirable, in a thrust bearing of the character indicated, to have a radial shoulder or surface on the inner ring to serve as an abutment for a tool to pull the bearing in an axial direction against the springs normally holding the thrust bearing in an innermost position so as to determine the clearance or end play of the axle in the journal box.

It is an object of the invention, therefore, to provide a thrust bearing of the character indicated which has a very substantial surface for normal contact with the end of a journal or axle and which, at the same time, has an opening or axial bore through the inner ring so as to give free access to the end of the journal or axle through the large bore in the inner ring.

It is another object to provide a thrust bearing of the character indicated which has improved means for engagement by a puller tool or the like, for pulling the inner ring to its limiting position for determining the extent of end play or axial clearance of the journal in the journal box.

Other objects and features of novelty and invention will be hereinafter pointed out, or will become apparent to those skilled in the art.

Figure 1:
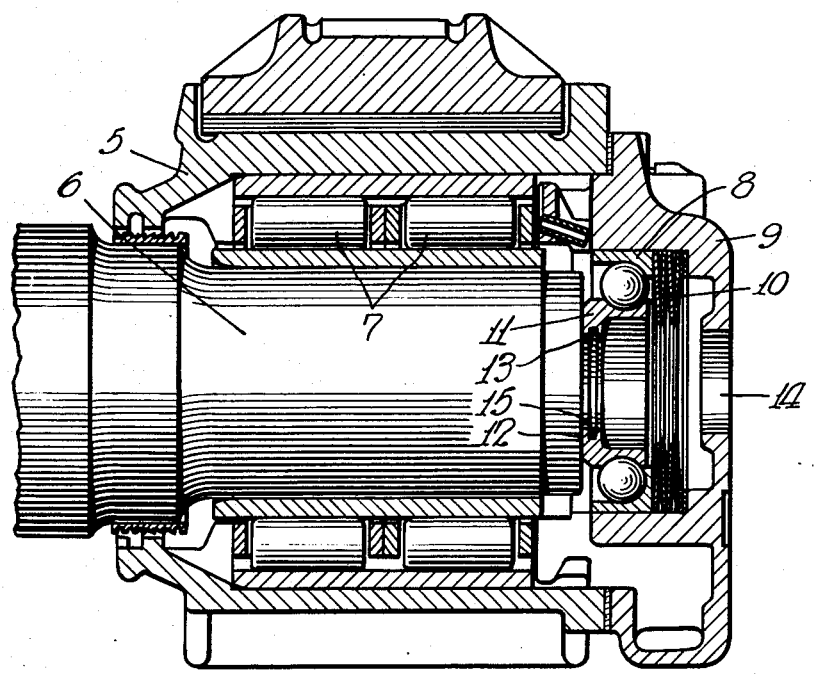

The drawing Fig. 1 is a central longitudinal vertical section through a railway journal bearing illustrative of my invention.

Figure 2:
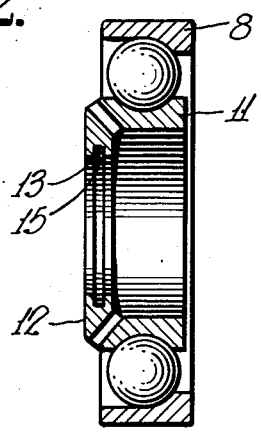

Fig. 2 is an enlarged sectional view of the thrust bearing shown in Fig. 1.

The invention is illustrated in connection with a journal box of the general form shown in Reynolds Patent 2,593,919, April 22, 1952, to which reference is made for a fuller description of a railway journal bearing. Briefly, the journal 6 of a railway bearing is received in a journal box 5, and the radial load is supported on anti-friction bearing members such as rolls 7. The end thrust loads of the axle or journal 6 is taken by a thrust bearing which, in the form illustrated, is an angular contact ball bearing 8. This thrust bearing has an outer bearing ring seated in some part of the journal box, such as in the cover 9 thereof, and is mounted for axial movement in the journal box. Resilient means such as so-called Belleville springs 10 are interposed between the outer bearing ring of the thrust bearing and the bottom of the bore receiving such outer ring, so that the effect of the springs is to urge the outer bearing ring toward the end of the axle, and so that the inner bearing ring 11 will be urged into and maintained in contact with the end of the journal 6.

As has been indicated, it is desirable to have an extensive face 12 of the inner ring in contact with the end of the axle 6 to cause the axle to rotate the inner ring during rotation of the axle itself. It is also desirable to have a relatively large opening, or bore, through the inner end of the inner ring so as to permit train control devices and the like to contact the axle itself and be rotated thereby. It is also desirable to provide means for pulling the inner ring of the bearing, and with it the outer ring to its extreme righthand position as viewed in Fig. 1, so as to determine the amount of end play or clearance between the axle and box which will be permitted.

In order to provide a bearing which has an extensive surface 12 for contact with the end of the axle and, at the same time, provide a very sizable bore through the inner ring so as to permit free access to the end of the axle, and also means whereby the inner ring may be engaged by a puller tool to determine the axial or end clearance of the thrust bearing, it is desirable to make a special inner ring. In the form illustrated, the inner ring 11 is in the general form of a cup with a large bore or opening in the bottom so as to provide a radially inwardly directed flange 13 and an extensive area 12, for engagement with the end of the journal. The large bore or opening 13 through the bottom of the cup will give free access to the central portion of the journal or axle 6 for train control mechanism. The inner ring is also provided with means defining a generally radial abutment to permit it to be engaged by a puller tool as heretofore noted. In the form shown, the inner ring adjacent the bore 13 is provided with abutment means for engagement by a puller tool which may be inserted through an opening 14 in the end of the housing. In the form shown, the abutment means for engagement by a puller tool is formed by a concentric annular groove 15 in the flange defining the bore 13. It will be seen that a suitable puller tool may pass freely through the opening 14 and through the bores of the Belleville springs and engage the generally radial abutment which is formed as a wall of the groove 15.

During normal use, the opening 14 in the journal box will be closed by a pipe plug, or other closure, but when it is desired to determine the end play or axial clearance, the plug may be removed from the opening or bore 14, and a puller tool inserted and engaged behind an abutment formed by the groove 15. The distance that the puller tool can be moved from normal toward the right, as viewed in Fig. 1, determines the end play or clearance at one end of the axle. By measuring the end play at the other end of the axle, the total end play may be determined, and the desired clearance may be varied by shims behind the Belleville spring. One apparatus for measuring clearance is set forth in Reynolds Patent 2,453,594, November 9, 1948.

It will be seen that I have thus provided a thrust bearing which has an extensive face on the inner ring for direct driving engagement with the end of the axle, and which has an extensive opening or bore to permit access directly to the end of the axle for train control devices and the like, and which also is provided with abutment means such as a radial shoulder adjacent an annular groove facing the large bore of the inner ring whereby the bearing may be engaged by a puller tool to determine the axial clearance in the bearing.

While the invention has been described in considerable detail and a preferred form illustrated, it is to be understood that modifications and changes may be made within the scope of the invention as defined in the appended claims.

I claim:

In a device of the character indicated, a journal box for a journal, anti-friction bearing members in said box for carrying the radial load of a journal, a thrust bearing carried by said journal box including an outer bearing ring seated in said box and spring means for urging the bearing inwardly toward a journal to be supported in said box, an inner bearing ring and anti-friction bearing members between said rings, said inner ring having a radially extended face to engage the end of a journal, as aforesaid, said inner ring having an enlarged central opening therethrough defining the radially inner extent of said radially extended face, said inner ring having an annular circumferentially continuous radially extending groove in said opening to define a radial abutment to be engaged by a tool for the purpose set forth.

References Cited in the file of this patent

UNITED STATES PATENTS

| Number | Name | Date |
|---|---|---|
| 2,593,919 | Reynolds | Apr. 22, 1952 |